United States Patent

Malcolm et al.

[11] Patent Number: 5,090,861
[45] Date of Patent: Feb. 25, 1992

[54] BOOK OR OTHER GRAPHIC ARTS CONSTRUCTION USING ADHESIVE RESISTANT TO COLD FLOW

[75] Inventors: David B. Malcolm, Maplewood; William L. Bunnelle, Hugo Township, Washington County, both of Mo.

[73] Assignee: H. B. Fuller Licensing & Financing, Wilmington, Del.

[21] Appl. No.: 739,848

[22] Filed: Aug. 2, 1991

Related U.S. Application Data

[63] Continuation of Ser. No. 553,448, Jul. 13, 1990, abandoned.

[51] Int. Cl.$^5$ .............................................. B42C 9/00
[52] U.S. Cl. .................................... 412/37; 281/21.1; 525/88; 525/89; 525/95; 525/98; 525/111.5; 525/242
[58] Field of Search ......................... 412/37; 281/21.1; 525/88, 89, 95, 98, 111.5, 242

[56] References Cited

U.S. PATENT DOCUMENTS

| | | | |
|---|---|---|---|
| 4,136,699 | 1/1979 | Collins et al. | 604/387 |
| 4,419,494 | 12/1983 | Puletti et al. | 525/95 |
| 4,526,577 | 7/1985 | Schmidt, Jr. et al. | 604/366 |
| 4,660,858 | 4/1987 | Flanagan | 281/21.1 |
| 4,712,808 | 12/1987 | Beh-Forrest et al. | 281/15.1 |

Primary Examiner—John Kight, III
Assistant Examiner—Sam A. Acquah
Attorney, Agent, or Firm—Merchant, Gould, Smith, Edell, Welter & Schmidt

[57] ABSTRACT

In the construction of a hard cover book or in the hinge application of a soft book cover or another graphic arts construction of this invention can be manufactured more efficiently with substantial resistance to cold flow or creep through the use of a single adhesive. The adhesive of choice for this application has an enhanced resistance to cold flow or creep, sufficiently high bond strength, and a viscosity that is controllable through a temperature range permitting it to be used for a variety of graphic arts construction applications.

6 Claims, No Drawings

BOOK OR OTHER GRAPHIC ARTS CONSTRUCTION USING ADHESIVE RESISTANT TO COLD FLOW

This is a continuation of application Ser. No. 07/553,448, filed July 13, 1990 now abandoned.

FIELD OF THE INVENTION

The invention relates to construction of a book or another graphic arts articles and to the articles made by adhesively joining components using a particular hot melt adhesive composition. The invention more particularly relates to hard or soft cover books wherein a hot melt adhesive is applied to a book block to which a hard or soft cover is attached. The adhesive used in the graphic arts applications of this invention has superior adhesion and cohesion, an unexpectedly high resistance to creep or cold flow, high construction bond strength, heat resistance and a viscosity profile designed for applications to books in which the adhesive can undergo severe stresses during manufacture and use.

BACKGROUND OF THE INVENTION

The prior art has suggested a number of application mechanisms for binding both hard and soft cover to book blocks. Both solvent or aqueous based adhesives and hot melts have been proposed. Additionally, adhesives with pressure-sensitive properties and adhesives generally considered to be non-pressure sensitive have been suggested for use in book preparation. However, in all of these adhesive categories, no single adhesive has the bond strength and resistance to creep or cold flow after assembly sufficient to maintain an adequate construction comprising the book block and cover sufficient to maintaining mechanical integrity of the book during all conditions of use. In larger books, such as dictionaries, encyclopedias, and other books of reference which can be large heavy books, the tendency of prior art adhesives to creep or cold flow under many conditions of storage can result in the separation of the cover of the book early in the lifetime of the volume.

Accordingly, a substantial need exists in the art for an adhesive that can sufficiently resist cold flow to maintain the mechanical integrity of a book cover on a book block.

BRIEF DESCRIPTION OF THE INVENTION

We have found that a hot melt adhesive having a high molecular weight radial A-B-A block copolymer can be used in forming both hard and soft cover books with substantial mechanical integrity.

DETAILED DISCUSSION OF THE INVENTION

Book Construction

In the manufacture of hard cover books, in the final assembly, the books are manufactured by combining a "book block" and a "book case or cover". The book block typically comprises the pages of a book which have either been sewn, mechanically formed or adhesively bonded to provide the page sequence required for reading and understanding. The hard cover book typically comprises cardboard covered by a variety of fabric or reinforced fabric materials. Commonly, the book block is manufactured by sewing together a series of smaller "signatures" which comprise a portion of the pages of the book. The signatures are assembled with heavy folded pages which are the binding site for the attachment for the cover. The book may also be manufactured using "the perfect binding technique". Long continuous sheets or webs of paper are printed with the text material of the book. The long sheets are then folded and arranged to form a series of stacks referred to as signatures which are then clamped cut and roughened to expose the fibrous nature of the page to make them more receptive to the application of hot melt adhesive compositions. After the application of a hot melt adhesive to the cut roughened pages, the adhesive is covered with an end paper to form the book spine.

The third procedure in book manufacture involves the creation of burst which is a perforate method wherein the book block obtains signature folds but burst or perforations are introduced into the inner most page of the signature and wherein the adhesive is applied to the burst or perforate notched signature to form the book block. After the book blocks are formed by the three methods set forth above, the books are rounded and backed. In the backing process, a reinforcing material can be applied to the spine which is called a "super" or "crash" using an adhesive. After the gauze-like scrim is applied to the book back, the book is then cased in by adhesively bonding the book block to the case or cover. In such an operation, two adhesives are used. First an adhesive is applied to the end papers which glue the end papers to the inside of the book cover. More importantly, a hot melt adhesive is applied to the lateral portions of the spine on the scrim to bind the cover to the edges of the spine. After the adhesive has been applied, the case and body are then passed through a machine to form the groove at the edge of the case spine. After the grooves are complete, the book block is bound to the cover and a hinge is formed that permits the cover and leaves to be mobile during reading. As can be seen, the major attachment of the cover to the book block and the major mechanical attachment of the book block to the cover resides in the hot melt adhesive applied to the lateral edge of the spine wherein the cover is attached and the hinge is created. The adhesives used to glue the end pages to the cover are useful in book construction, however, the major mechanical integrity of the book is derived from the hot melt adhesive.

Flexible or soft cover books are generally formed by coating a layer of hot melt adhesive on the secured edges of a series of printed paper assemblies or signatures to form a book block to which a paper backing or other suitable covers apply to form the spine of a book. While this process produces the primary bonding of the book block to a cover, a secondary bond is often formed at the hinge or adjoined of the cover. This bond is produced by applying a small amount of adhesive to the outer sheet of each side of the book block immediately adjacent to the hinge area. This hinge joint formation is actually carried out in two separate steps with the adhesive being applied to the book block before the cover is affixed and a joint then being formed by an application of pressure to the book cover at some point after the application of the adhesive in the manufacturing operation. The purpose of this adhesive application is to conceal the binding adhesive and also reinforce the binding and to prevent the book from falling apart relatively easily when grasped only by the flexible cover.

Both hard cover and soft cover book manufacture operations are similar in that adhesive is applied to the outer sheet of each side of the book block, the back of the book block or adjacent to the hinge area before the covers are applied.

Adhesives used for this hard cover and soft cover book manufacture must possess a variety of properties. Specifically, it must possess acceptable viscosity for application, strong aggressive tack at the point of formation of the hinge bond, good adhesion to cover stocks that are somewhat resistant to bonding and substantial resistance to creep or cold flow, both at room temperature and under elevated temperature conditions common in manufacture and storage. Adhesives used in such book manufacture have commonly been nonpressure-sensitive adhesives. However, the industry has shown some acceptance to the use of pressure-sensitive adhesives or semipressure-sensitive adhesives. Such adhesive use decreases book rejects due to stoppage of production lines and other problems in manufacture. However, the tendency to the increased use of pressure-sensitive adhesives has increased the tendency of the adhesive to be subject to failure of the book attachment through cold flow or creep.

Examples of such hot melt adhesives used in book manufacture are shown in Flannagan, U.S. Pat. No. 4,660,858 and Beh-Forrest et al, U.S. Pat. No. 4,712,808. The adhesives set forth in these patents are hot melt pressure-sensitive adhesives comprising 20 to 35% by weight of an A-B-A block or an A-B-A-B multi-block copolymer; 45 to 70% by weight of a compatible tackifying resin; 5 to 30% by weight of a plasticizing oil and other additional adhesive components. Pulettiet al, U.S. Pat. No. 4,419,494 teaches the use of S-B-S linear A-B-A copolymers in conjunction with fatty acid polyimid and heat resistant hot melt adhesives. Collins et al, U.S. Pat. No. 4,136,699 teaches an A-B-A copolymer based construction of absorbent articles. Schmidt, Jr. et al, U.S. Pat. No. 4,526,577 is directed to the use of A-B-A block and linear A-B-A-B-A-B multi-block copolymers and hot melt adhesive in the manufacture of disposable articles. In these patents, the adhesive contains an A-B-A block or multi-block copolymer sold under the names of STEREON 840A, STEREON SR7092, KRATON 1101, 1102, 1650, 1652, 1657, SOLPRENE 481 and 423. Such A-B-A copolymers have a molecular weight in the range of about 70,000 to 140,000 and are used in conventional application of well known adhesive technology to book binding or graphic arts constructions. However, these adhesives have significant tendency to cold flow or creep under common conditions present in manufacture, storage and use of books and other graphic arts materials. A particularly difficult environment for such hot melt adhesives resides in the manufacture of large reference books such as dictionaries, encyclopedias, etc. Such books have pages that can be in excess of 5 inches in a dimension, can have large number of pages, in excess of 2,000, and even using thin paper stock, can have a weight in excess of 15 pounds. Commonly, such reference materials are displayed in a library in a book case wherein a book back is displayed to a viewer and the weight of the book block is supported by the ends of the cover. Such a display mode places a great deal of stress on the hot melt adhesive holding the book block in the case or cover. While the commonly available or commercial pressure-sensitive adhesives are useful in hard and soft cover book manufacture, significant need has been expressed by book manufacturers for increase creep resistance in pressure-sensitive adhesives. Non-pressure sensitive EVA based hot melts have not generally been prone to creep failure, but instead are subject to problems related to insufficient open time during machine slow downs and stops. Pressure-sensitives, while not limited to open time, have been prone to creep under stress, especially when large book blocks are employed. Accordingly, a substantial need exists in increasing the creep resistance or resistance to cold flow in hot melt block copolymer containing book binding materials.

We have found that surprisingly low levels of a radial block copolymer having a molecular weight of greater than about 140,000, preferably greater than 160,000 can be used to obtain a very high level of creep resistance or resistance to cold flow, excellent bond strengths, and acceptable viscosity profile in the construction of both hard and soft cover books in other graphic arts application. The adhesive can be used as a construction adhesive for both hard cover and soft cover book cover attachment to book blocks as a non-pressure sensitive adhesive and a pressure-sensitive adhesive.

The radial block copolymer can be blended in amounts that are surprisingly small in comparison to the prior art adhesives as represented by Schmidt, Jr. et al, U.S. Pat. No. 4,526,577, Beh- Forrest et al, U.S. Pat. No. 4,712,808 and Flannagan, U.S. Pat. No. 4,460,858. The radial block copolymers of the invention can optionally be combined with linear A-B-A (both SIS and SBS) block copolymers to produce entities of having enhanced adhesion and cohesion, high bond strength, resistance to creep or cold flow and resistance to peel when compared to prior art adhesives. The adhesive can have a viscosity profile and application temperatures which typically range from 250°-350° F. useful in any of the construction steps in the manufacture of hard and soft cover books. However, the adhesive of this invention is most useful in the attachment of the cover to the spine through the application of the hot melt adhesive to the hinge area of the scrim reinforcement material.

Radial (or teleblock) copolymers having a molecular weight in access of about 140,000 are known as shown in the Shell brochure for KRATON 1184. In inspection of the brochure indicates that the material is primarily positioned for use as a flexibilizing agent for bituminous compositions such as asphalt. The brochure does not indicate that such radial block material is useful for adhesive applications or in any other adhesive related use.

The radial or teleblock copolymers having a molecular weight above 140,000 present significant difficulties in adhesive preparation to manufacturing personnel. While laboratory blending apparatus can be used to manufacture adhesives in small laboratory scale amounts from such radial block copolymers, typical single stage hot melt manufacturing or plant blending techniques, utilized in preparation of prior art adhesives made of typical A-B-A block copolymers and A-B-A-B-A-B multi-block copolymers as represented by Schmidt, Jr., U.S. Pat. No. 4,256,577, fail to adequately blend high molecular weight radial block copolymers with tackifiers or plasticizers into useful adhesive compositions.

Further, the high molecular weight of the radial block copolymers when used at a concentration found in typical adhesive formulations (about 20 wt-% and more) results in a viscosity that exceeds production specifications or machine application specifications in typical extrusion, multi-line or fine line construction or elastic attachment methods.

We have found techniques for use with radial or teleblock polymers in hot melt adhesive preparations that permit the rapid and effective preparation of the unique adhesive of the invention. These techniques involve a dual stage or multi-stage process in which a preblend of the high molecular weight radial block copolymers with a lower molecular weight adhesive component such as either a tackifier, a plasticizer or mixtures thereof, is prepared. The preblend can then be combined with the balance of the adhesive components to form a useful hot melt adhesive composition through a complete intimate blending of the components. We have also found that the adhesive compositions, manufactured with these techniques, have significantly reduced processing time.

The adhesives of this invention can maintain a S.A.F.T. of about 160° to 190° F., a creep resistance of less than about 30 mils at 105° F. (40° C.), and exhibit a viscosity of less than about 15,000 centipoise (cP) at 250° F. The books made with the adhesive are storage stable at 140° F. with little or no delamination (cover failure) and exhibit substrate failure in the dynamic peel adhesion mode.

The radial block copolymers useful in manufacturing the adhesives of the invention have a molecular weight of about 145,000 and have the general formula:

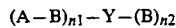

$(A-B)_{n1}-Y-(B)_{n2}$ wherein A is a glassy block of a polymerized vinyl substituted aromatic monomer, B is a saturated or unsaturated rubbery block of a polymerized diene having 4–12 carbon atoms, Y is a polyfunctional coupling agent residue, $n_1$ is an integer of at least 3, preferably 3 to 10, most preferably 3 to 5 and $n_2$ is an integer of 0 to 10, most preferably 0 to 4. The A or mid B blocks can be homo or copolymers of related monomers. Further, at the transition between the blocks some random copolymerization of the A monomers with B monomers can exist.

The preferred rubbers are radial block copolymers having the general formulae

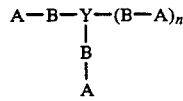

```
A—B—Y—(B—A)_n
    |
    B
    |
    A
``` wherein n is 1–3, the A block comprises styrene and the B block comprises butadiene, isoprene, or mixtures thereof which can be hydrogenated. The preferred radial block copolymers contain preferably 15 to 45 wt-%, most preferably 25 to 35 wt-% of styrene. The average molecular weight of the preferred rubbery block copolymers is at least about 140,000. Most preferably the molecular weight of the block copolymers used in the adhesives of this invention is greater than about 160,000. Currently no radial block copolymer has a molecular weight greater than about 275,000. However we believe increased molecular weights would be beneficial to the adhesives of the invention.

The polyfunctional coupling agents (Y) are well known coupling agents for use in the manufacture of the radial block copolymers of the invention. Such coupling agents and the preparations of the rubbery copolymers useful in the adhesive compositions of the invention are described in detail in a variety of patents including U.S. Pat. No. 3,639,521 and others.

A-B-A block copolymers can be used with the radial block polymers. The A blocks of such A-B-A block copolymer comprise blocks of polymerized vinyl substituted aromatic monomers and the B blocks comprise polymerized dienes having 4–12 carbon atoms. Preferably the A-B-A block copolymers are made of A blocks comprising polymerized styrene and B blocks comprising polymerized butadiene, isoprene or mixtures thereof. Such copolymers typically have a molecular weight in the range of about 70,000–140,000 and have from about 12 to 35 wt-% styrene. Such linear and multi-block copolymers are available from Shell Chemical Company, Enichem, Fina and Firestone.

We have found that the adhesive's excellent construction and construction properties can be improved by stabilizing the oil component of the adhesive. We believe that the migration of oil from the adhesive mass to the bond line between the adhesive and the book components, including, for example, paper, page, cover, a polyolefin film, etc., can cause failure of the adhesive bonds. Stabilizing the oil in the adhesive preventing its migration from the adhesive composition can increase bond strength. We have found that the bond strength can be improved using at least two mechanisms. First a gelling agent can be used which forms an adhesive contained oil gel. The gel effectively locks the oil in place within the adhesive mass, preventing its migration. Additionally, highly compatible oil tackifying agents can be used which through compatibility tend to prevent migration.

Tackifying Resin

The adhesives of the invention contain a tackifying resin in combination with a thermoplastic block copolymer and a plasticizer. Tackifying resins useful in the adhesives of the invention comprise rosin derivatives including wood rosin, tall oil, tall oil derivatives, rosin ester resins, natural and synthetic terpenes and aliphatic or mixed aliphatic-aromatic tackifying resins.

Aromatic monomers useful in forming the aliphatic aromatic resin compositions of this invention can be prepared from any monomer containing substantial aromatic qualities and a polymerizable unsaturated group. Typical examples of such aromatic monomers include the styrenic monomers, styrene, alphamethyl styrene, vinyl toluene, methoxy styrene, tertiary butyl styrene, chlorostyrene, etc., indene monomers including indene, methyl indene and others. Aliphatic monomers are typical natural and synthetic terpenes which contain $C_5$ and $C_6$ cyclohexyl or cyclopentyl saturated groups that can additionally contain a variety of substantial aromatic ring substituents. Aliphatic tackifying resins can be made by polymerizing a feed stream containing sufficient aliphatic monomers such that the resulting resin exhibits aliphatic characteristics. Such feed streams can contain other aliphatic unsaturated monomers such as 1,3-butadiene, cis-1,3-pentadiene, trans-1,3-pentadiene, 2-methyl-1,3-butadiene, 2-methyl-2-butene, cyclopentadiene, dicyclopentadiene, terpene monomers and others. Mixed aliphatic aromatic resins contain sufficient aromatic monomers and sufficient aliphatic monomers and optionally other $C_3$-$C_8$ unsaturated monomers to produce a resin having both aliphatic and aromatic character. The article by Davis, *The Chemistry of $C_5$ Resins*, discusses synthetic $C_5$ resin technology.

The adhesive compositions of the invention can contain rosin and rosin derivatives as a tackifying agent. Rosin is a solid material that occurs naturally in the oleo rosin of pine trees and typically is derived from the oleo resinous exudate of the living tree, from aged stumps and from tall oil produced as a by-product of kraft paper manufacture. After it is obtained rosin can be treated by hydrogenation, dehydrogenation, polymerization, esterification, and other post treatment processes. Rosin is typically classed as a gum rosin, a wood rosin, or as a tall oil rosin which indicate its source. The materials can be used unmodified, in the form of esters of polyhydric alcohols, and can be polymerized through the inherent unsaturation of the molecules. Materials are commercially available and can be blended into the adhesive compositions using standard blending techniques. Representative examples of such rosin derivatives include pentaerythritol esters of tall oil, gum rosin, wood rosin, or mixtures thereof.

Representative examples of such aliphatic resins include hydrogenated synthetic $C_9$ resins, synthetic branched and unbranched $C_5$ resins and mixtures thereof. Representative examples of such aromatic tackifying resins include styrenated terpene resins, styrenated $C_5$ resins or mixtures thereof. The selection of tackifying resins is often based on the nature of the B or midblock radial block copolymer. Rosin derivatives are best for S-I-S/S-B-S blends and can be used with either S-I-S or S-B-S alone. Hydrogenated $C_9$ or straight aliphatic resins are preferred for S-I-S copolymers. For S-B-S copolymers, styrenated terpenes or rosin esters are preferred.

Plasticizing Oils

Plasticizing oils are used in the construction adhesives of the invention. Such oils are primarily hydrocarbon oils low in aromatic content. Preferably the oils are paraffinic or naphathenic in character. The oils are preferably low in volatility, are clear and have a little color and odor as possible. The use of a plasticizing oil of this invention also contemplates the use of olefin oligomers, low molecular weight polymers, vegetable oils and their derivatives and similar plasticizing liquids.

Oil Gelling or Complexing Agents

Plasticizing oils used in adhesive compositions can be prevented from migration by the use of gelling or complexing agents which tend to restrain the migration of oil through formations of gels or complexes. The oil can be restrained by a variety of gelling agents including waxes, polyethylene waxes, oxidized waxes, oxidized polyethylene waxes, polyvalent metal soaps, etc.

The following table sets forth the useful, preferred, and most preferred formulas.

TABLE 1

| Ingredient | Useful | Preferred | Most Preferred |
|---|---|---|---|
| Radial block copolymer* | 5-14 | 7-13 | 8-12 |
| A-B-A block copolymer* | 0-14 | 0-12 | — |
| Tackifier | 45-85 | 50-80 | 50-70 |
| Plasticizing oil | 5-45 | 10-40 | 10-30 |
| Synthetic polyethylene wax (or other oil complexing agent) | 0-10 | 0.1-9 | — |

*Total polymer content (including both radial block and linear block polymer) is typically about 15 wt - % or less of the adhesive.

In sharp contrast to prior art single stage blending procedures for the manufacture of pressure sensitive hot melt disposable article construction adhesives which are represented by Schmidt, Jr. et al., U.S. Pat. No. 4,526,577, we have found that effective commercial manufacture of the hot melt adhesives of this invention using high molecular weight radial block copolymers involves a two-step manufacturing procedure. In the first step the radial block copolymer is mixed at elevated temperature with at least one additional adhesive component such as a tackifier, plasticizers, or mixtures thereof to form a preblend or a premix wherein the block copolymer is intimately mixed with the other adhesive ingredient. The preblend is then blended with the remaining adhesive components at elevated temperature in standard commercial blending equipment.

In somewhat greater detail, from about 0.5 part of resin to about 2.5 parts of resin can be blended per part of radial block copolymer in order to form the preblend of the invention. The preblends can be prepared in conventional thermoplastic polymer processing equipment capable of providing sufficiently high shear to intimately blend the high molecular weight polymers and the low molecular weight adhesive components such as tackifying resins, oils or other low molecular weight polymeric materials or blends thereof. Examples of such equipment are single or twin screw extruders, intensive internal mixers, Mixtruders, Sigma Blade mixers and the like, which are heated to a sufficient processing temperature, typically between 250°-350° F. If a batch mixer is used the polymer is blended with the adhesive component such as resin, oil or component blends thereof, typically at an amount less than or equal to the polymer to provide a homogeneous preblend. Thereafter the remaining ingredients can be added and mixed until homogeneous.

The equipment and processes useful in the manufacture of the preblend materials of the invention is described in the following articles. The article "Machinery and Equipment" of *Plastics Compounding Redbook of 1987/88*, is a compilation of information regarding compounding and size reduction equipment including lab and production scale blending apparatus. The articles "Liquid Resin Injection System for Continuous Mixing of HMPSA" and "Extruder Performance Over Broad Melt Index Ranges" discuss blending materials having different viscosity profiles.

The article "Advance in Production and Coating Technology for Hot Melt Pressure Sensitive Adhesives - Multiruder System" discusses the multiruder system of premixer, multiruder and coater and is used for continuous production and coating of hot melt pressure sensitive adhesives for labels and tapes.

The article "Continuous Compounding of Hot Melt Adhesives" discusses continuously operating blending systems capable of blending hot melt adhesives with reduced heat history. Such compounding systems involve extrusion processing.

The article "Technical Aspects for Extrusion Compounding of Hot Melt Adhesives" discusses continuous processing systems for the manufacture of hot melt and pressure sensitive adhesive formulations using batch and twin screw manufacturing methods.

The article "Twin Screw Extruder Process of Adhesive" discusses continuous processing hot melt adhesive compounding with block polymer formulations using multi-stage feeding of oil resins, additives and base polymer.

The article "Continuous Production of Hot Melt Adhesives Aspects of Quality and Costing" discusses basic processing possibilities for producing hot melts continuously involving working from a premix and deals with four basic continuous processes. The disclosure involves multi-stage addition, pelletizing, coating, etc. Equipment for such manufacture is shown in the brochures of Welding Engineers, Inc., Egan Manufacturing Company, Buss-Kneader, Warner and Pfleiderer, Conair and Black Clausen. The disclosures of which relating to equipment and processing are hereby incorporated by reference herein.

We have found that for ease of handling the preblend of the invention can be divided into pieces sized for further processing. We have found that the preblend can be pelletized using a strand, waterface or underwater pelletizer (such as those made by Black Clausen). An underwater pelletizing system can be used in which a water stream removes the cut pellet from the cutting area and directs the water-pellet stream to a centrifugal device that separates the water from the pellet and dries the pellets to a useful format.

The handling properties of the preblend pellets can be improved by treating the surface of the pellets with a nontacky organic or inorganic coating. Such coatings can comprise aqueous dispersions of water insoluble waxes, fatty acid esters, and other known anti-blocking agents. Useful inorganic anti-blocking agents can include such materials as silica, talc, gypsum, calcium oxide, magnesium oxide, etc. One mode of adding the antiblocking agent to the adhesive pellets is in the circulating water in the pelletizing machine. An addition of the antiblocking agent to the water inherently coats the pellets as they are formed at the cutting head with the antiblocking agent which remains after the pellet is separated from the water solution and dried.

The hot melt adhesive of the invention can be manufactured by pillow pelletizing, a procedure such as that disclosed in Franke, U.S. Pat. Nos. 3,723,035 and 4,054,632. The pillow-shaped pellets can be coated with a nonblocking thermoplastic coating agent. Such coating agents are known, for example EPOLENE C-10 from Eastman Chemical or AC-400 from Allied Chemical, or blends of compatible polymers and additives to control coating viscosity as required to obtain a uniform protective coat. Additionally, the preblend can be extruded in multiple ribbons onto a cooled stainless belt precoated with a compatible thermoplastic coating.

TEST PROCEDURES

Determining a Hot Melt Viscosity Using a Brookfield Thermosel

This method covers the procedure for viscosity measurement of hot melt adhesives.

Summary of Method

A measured amount of sample is melted in a Thermosel Viscometer, the spindle is immersed and the viscosity measured after the temperature has equilibrated.

Detailed Procedure

Material and Equipment

1. Brookfield Thermosel
2. Spindles SC4-21, SC4-27, SC4-29
3. Brookfield Viscometer (preferably Model RVT)
4. Balance accurate to ±0.25 g.

Procedure

1. Calibrate Thermosel Viscometer according to HMT-56.
2. Preheat the Thermosel to the desired temperature.
3. Attach the specified spindle.
4. Weight the amount of hot melt specified for each spindle and place in the Thermosel chamber.

As soon as possible, immerse the spindle in the melted hot melt. Turn on the viscometer. The viscosity is taken 30 minutes after the spindle has been completely immersed.

STANDARD HOT MELT LAB TEST PROCEDURE

Determination of Drop Point by Mettler Cup and Ball Method

Scope

This method is used to define the drop point of a psuedocrystalline material. This method is applicable to waxes, tallows, and similar substances.

Summary of Method

Sample is monitored by photocell while it is electrically heated at a predetermined rate of temperature increase. Obscuration of the light beam by sample flow triggers a response in the microprocessor.

Materials

Mettler FP-80/83 Thermosystem

Method

1. Pour melted sample into Mettler drop point (2.8 mm) crucible, filling it half full.
2. Wipe excess material from crucible exterior without dislodging sample as it cools. (The creation of air pockets or voids in the sample can significantly alter results.)
3. Set sample aside for minimum of four hours; overnight is suggested.
4. Load filled crucible into cartridge with lead ball on top of sample.
5. Place assembled cartridge in the FP-83 furnace. Insure that cartridge and furnace fittings are properly aligned.
6. Set selector switch on the plug of the measuring cell to drop point mode (small cup).
7. Switch FP-80 unit on or reset if you have already done so.
8. A starting temperature of 5°-10° C. (15°-20° F.) below the expected drop point is selected and entered on the FP-80 processor keyboard, and starting temperature key is pressed.
9. A heating rate of IC/min (1.8F/min) is prescribed. This heating rate is automatically present, but may be varied for modifications of this test by entering the desired rate and pressing the rate key.
10. Press the Run./Stop key and you will see a identification prompt in the display. You may enter up to 4 digits for identification purposes.
11. Press the Run/Stop key again and the FP-80/83 will begin automatically after a 30 second waiting period. (This waiting period may be overridden by pressing Run/Stop one more time, however, the 30 second wait is recommended.)

12. As soon as the sample flows out of the cup and crosses the light beam, the drop point will be either displayed or printed out.

Determining Shear Adhesion Failure Temperature (SAFT) of Pressure-Sensitive Adhesive Material and Equipment 1. Forced air oven programmed to increase at a 25 Deg. C/hour rate from room temperature to 175 Deg. C.
2. Device in oven capable of suspending a 1" wide adhesive film in the shear mode.
3. 500 gram weights.
4. Adhesive coated on film backing, preferably 2 mil MYLAR.
5. Device to monitor the oven temperature (i.e., thermometer, thermal couple, etc.)
6. Adhesive coated MYLAR (25±3 g/sq. meter coat weight).

Procedure

A. Specimen Preparation

1. Cut two strips of adhesive film 1: wide by 3" long.
2. Roll the release paper back on one end of each strip, exposing at least an inch of adhesive.
3. Laminate the two films end to end by pressing two adhesive coated surfaces together to form a 1 square inch bond. Take care not to entrap any air bubbles.

B. Testing

1. Suspend the specimen in the oven by firmly affixing one end from the specimen support.
2. Hang a 500 gram weight from the bottom end of the specimen allowing it to hang freely.
3. Start oven program.
4. Record the temperature at which the sample delaminates to the nearest degree C.

Report

Report the average of at least three samples to the nearest degree C., as the shear adhesion failure temperature (SAFT).

Determination of Creep Resistance in Shear Mode (500 grams for 5 hours at 105° F.)

Summary

The method exposes an adhesive film to a shear between two films and measures the shear mode movement of one film with respect to the other due to adhesive cold flow.

Specimens of adhesive in 20 mil (0.020 in) thickness, are prepared from testing by pressing air free material between sheets of release paper. A 20 mil shim is utilized to restrict compression and control adhesive thickness. Sheets of Milan film are cut to 1 inch by 6 inch dimensions. A Sentinal heat sealer is used with no heat and minimal pressure (20 PSI). To bond ½ inch×3 inch specimens of adhesive between sheets of Mylar. The laminated film-adhesive-film composites are tested the following day by exposure to 105° F. oven temperature for five (5) hours with 500 gram weights applied to the samples in a shear mode. A micrometer is used to measure in thousandths of an inch (mils), the creep which occurs to the sample under those conditions. (Lines are marked on corresponding sides of the milar films as to the original position of the adhesive between the milar's creep is increased in terms of the divergence of the marks relative to their original position. The creep should be as little as possible but a creep of less than 30 mils, preferably less than 25 mils, most preferably less than 20 mils is desired to produce mechanically stable book constructions.

COMPARATIVE EXAMPLE A

Using a READCO high share mixer an adhesive for book binding, similar to adhesives disclosed in Flannagan, U.S. Pat. No. 4,660,858, was produced having the following ingredients:

TABLE 2

| Ingredient | Name | Percent |
|---|---|---|
| A-B-A Multi-block copolymer | STEREON 840A | 10.0 |
| A-B-A Block copolymer | KRATON 1111 | 10.0 |
| Plasticizing oil | 1200 Second Oil | 20.0 |
| Tackifying resin | WINGTAC 86 | 18.0 |
| Tackifying resin | PERMALIN 603 | 29.2 |
| Tackifying resin | ZONATAC 501 LIT | 10.0 |
| Antioxidant blend | (IRGANOX 1010 & 1076) | 0.8 |

EXAMPLE 1

In a brabender extruder mechanism, approximately equal weights of a radial A-B-A block copolymer having a molecular weight of about 184,000 (KRATON D-1184, Shell Chemical Company) and a styrenated-terpene tackifying resin (ZONATAC 501 LITE) were blended and extruded from the extruder mechanism at elevated temperature to form an initial homogeneous blend of the resin and radial copolymer. Using conventional high sheer mixers, the preblend was then combined with additional adhesive ingredients to result in an adhesive having the following ingredients:

TABLE 3

| Ingredient | Name | Percent |
|---|---|---|
| A-B-A Block Copolymer | KRATON D-1184 | 9.2 |
| Tackifying Resin | ZONATAC 501 LITE | 61.3 |
| Plasticizing Oil | 1200 Second Oil | 26.0 |
| Stabilizer | IRGANOX 1010 | 0.5 |
| Coating | | 3.0 |

TABLE 4

| Brookfield Thermosel Viscosity Curve: | Comparative Example 1 | Example 1 |
|---|---|---|
| @250° F. | 18,000 cps | 12,500 cps |
| @300° F. | 3,800 cps | 2,900 cps |
| @350° F. | 1,400 cps | 1,075 cps |
| Mettler Softening Point | 185° F. | 195° F. |
| SAFT (500 g) | 155° F. | 163° F. |
| Creep Resistance | 87.5 mils | 16.25 mils |

The comparison between Example 1 and Comparative Example A shows the adhesive of Example 1 having a lower viscosity curve which would increase the ease of application of the material at typical hot melt application temperatures. The data further shows comparable mettler softening points and increase SAFT results for the product of Example 1. However, the most marked improvement in adhesive properties resides in the creep resistance of the material. In the product of Example 1 has a creep resistance of 16.25 mils verses 87.5 mils for the material of Example 1, a surprisingly superior creep resistance. The creep resistance and other adhesive properties is even more surprising in view of the low polymer content of Example 1.

The above discussion provides a basis for understanding the spirit and scope of the invention. However, since many embodiments of the invention can be made obtaining the benefits of the invention, the invention resides in the claims hereinafter appended.

We claim:

1. A process for the attachment of a book cover to a book block with an adhesive resistant to creep and shear, formed from a hot melt adhesive, which process comprises applying the adhesive to book block at an area immediately adjacent to the bound edges of the book block in a length substantially coterminous with the bound edges; applying the cover to the book block in proper alignment, and exerting pressure on the book cover in the area of the adhesive; wherein the hot melt adhesive is a composition comprising:

(a) About 5 to 14 wt-% of a radial block copolymer having a molecular weight of at least about 145,000, having the formula:

$$(A-B)_{n1}-Y-(B)_{n2}$$

wherein Y is a multivalent coupling agent, A comprises a polyvinyl substituted aromatic block, B comprises a polybutadiene rubbery midblock, n1 is an inter of 3 to 10 and n2 is an integer of at least 0 to 10;

(b) about 45 to 85 wt-% of a compatible tackifying resin selected from the group consisting of a $C_5$ resin, a styrenated terpene resin, a hydrogenated $C_9$ resin, a rosin derivative, a styrenated terpene resin and mixtures thereof; and (c) about 5 to 45 wt-% of a plasticizing oil.

2. The process of claim 1 wherein the book is a soft cover book and the adhesive is applied to the book spine.

3. The process of claim 1 wherein the book is a hard cover book and the adhesive is applied to the lateral edges of the book block.

4. A book comprising:
   (i) a book block; and
   (ii) a cover;
   wherein the book block is bounded to the cover with a hot melt adhesive composition applied to the bound spine of the book blocks, which adhesive comprises:

(a) about 5 to 14 wt-% of a radial block copolymer having a molecular weight of at least 145,000, having the formula:

$$(A-B)_n-Y$$

wherein Y is a multivalent coupling agent, A comprises a polyvinyl substituted aromatic block, B comprises a polymeric rubbery midblock, and n comprises an integer of at least 3;

(b) about 45 to 85 wt-% of a compatible tackifying resin selected from the group consisting of a $C_5$ resin, a styrenated $C_5$ resin, a styrenated terpene resin, a hydrogenated $C_9$ resin, a rosin derivative, a styrenated terpene resin and mixtures thereof; and (c) about 5 to 45 wt-% of a plasticizing oil.

5. The book of claim 4 wherein the cover comprises a soft cover.

6. The book of claim 4 wherein the cover comprises a hard cover.

* * * * *